United States Patent [19]

Fries et al.

[11] 4,082,564
[45] Apr. 4, 1978

[54] SUGAR DECOLORIZING QUATERNARY AMMONIUM ACRYLAMIDE RESINS

[75] Inventors: William Fries, South Hampton; Silvia Napierski, Andalusia, both of Pa.

[73] Assignee: Rohm and Haas Company, Philadelphia, Pa.

[21] Appl. No.: 780,618

[22] Filed: Mar. 23, 1977

Related U.S. Application Data

[62] Division of Ser. No. 615,144, Sep. 19, 1975, abandoned.

[51] Int. Cl.$^2$ .............................................. C13D 3/00
[52] U.S. Cl. ............................ 127/46 A; 260/2.1 E
[58] Field of Search .................. 260/2.1 E; 127/46 A; 526/16, 49, 42

[56] References Cited

U.S. PATENT DOCUMENTS

| | | | |
|---|---|---|---|
| 3,166,546 | 6/1965 | Melamed | 526/16 |
| 3,262,917 | 7/1966 | Maede | 526/16 |
| 3,791,866 | 2/1974 | Kunin et al. | 127/46 A |
| 3,957,710 | 5/1976 | Rohmann et al. | 260/29.6 HN |
| 3,966,489 | 6/1976 | Barrett et al. | 127/46 A |

*Primary Examiner*—Joseph L. Schofer
*Assistant Examiner*—Peter F. Kulkosky
*Attorney, Agent, or Firm*—L. E. Johnson; A. M. Esterlitz; L. F. Kline

[57] ABSTRACT

Crosslinked macroreticular and gel-type quaternary ammonium acrylamide anion exchange resins which possess a potential for hydrophobic bonding and thereby display a high affinity for slightly ionized or unionized refractory color bodies as well as for the more easily removed color bodies in aqueous sugar solutions are provided.

8 Claims, No Drawings

SUGAR DECOLORIZING QUATERNARY AMMONIUM ACRYLAMIDE RESINS

This is a division, of application Ser. No. 615,144 filed Sept. 19, 1975, now abandoned.

This invention relates to crosslinked macroreticular (MR) and gel-type quaternary ammonium acrylamide anion exchange resins, to the preparation thereof, and to the use thereof especially as sugar decolorizing agents.

It is known in the art to decolorize aqueous sugar solutions by contacting the solutions with a "series combination" of agents such as granular carbon, bone char, and conventional ion exchange resins. (The term "series combination" as used herein means a series of decolorizing agents, the members of which comprise either a single agent or a combination of one or more agents used sequentially). Considerable progress has been made in recent years in purifying sugar with ion exchange resins as primary decolorizing agents. However, the effluent quality still remains below most desirable levels upon treatment with ion exchange resins as primary decolorizing agents.

Kunin and Fries (U.S. Pat. No. 3,791,866) describe a crosslinked macroreticular quaternary ammonium acrylamide resin having units of the formula:

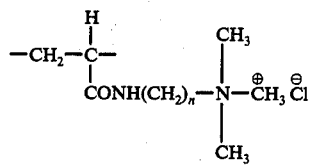

Kunin and Fries (U.S. Pat. No. 3,791,866) and Reiner (U.S. Pat. No. 2,874,132) describe macroreticular and gel type quaternary ammonium styrene-divinylbenzene resins respectively prepared from a styrene-divinylbenzyl copolymer which is chloroalkylated and then aminated with a tertiary amine of which trimethylamine, benzyldimethylamine, dibenzylmethylamine and the like are typical.

Melamed (U.S. Pat. No. 2,980,657) describes a linear non-crosslinked polymer having units of the formula:

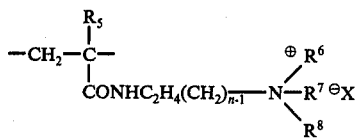

where $R^5$ is hydrogen or methyl, $n$ is an integer from 1 to 2, $R^6$ and $R^7$ are methyl or ethyl, and $R^8$ is a saturated or unsaturated aliphatic hydrocarbon having 1-18 carbon atoms, and X is OH or a negative salt-forming atom or radical. These quaternary ammonium resins and linear copolymers of the prior art, however, suffer some deficiencies which make them less desirable as primary agents.

It is an object of the present invention to provide crosslinked macroreticular and gel-type quaternary ammonium anion exchange resins which, as a result of a properly selected oleophilic hydrocarbyl functional group bonded to the quaternary nitrogen atom, possess a potential for hydrophobic bonding and thereby display a high affinity for slightly ionized or unionized refractory color bodies as well as for the more easily removed color bodies in aqueous sugar solutions.

A further object is to provide a method for decolorizing aqueous sugar solutions by contacting the sugar solution with the resins of this invention. A still further object is to provide a method for preparing the resins of this invention. A more particular object is to provide crosslinked macroreticular or gel-type quaternary ammonium acrylamide resins having units of formula I as a product of the following equation:

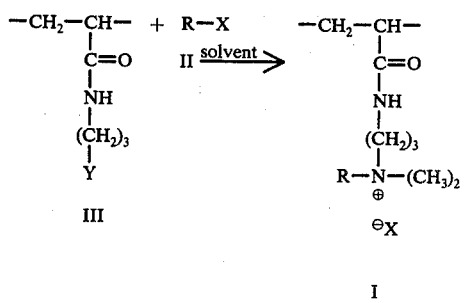

wherein
R is a hydrocarbyl functional group which is selected from the group which comprises substituted or unsubstituted (a) alkyl, (b) aralkyl, (c) aryl, and (d) alkaryl group which contains 5 – 22 carbon atoms, is linear or branched, is saturated or unsaturated or a combination of the two, and, if substituted, contains 1 – 3 alkoxy, acyl, acyloxy, or hydroxy groups;

X is an anion selected from the group which comprises hydroxide, halide, alkyl sulfate, bisulfate, alkyl and aryl sulfonate, and the dimethylamino groups;

Y is a halide or the dimethylamino functional group.

Preferably, R is a hydrocarbyl functional group which is selected from the group which comprises a substituted or unsubstituted (a) alkyl, or (b) aralkyl group which contains 5 – 18 carbon atoms, is linear or branched, is saturated or unsaturated or a combination of the two, and, if substituted, contains 1 – 3 alkoxy, acyl, acyloxy, or hydroxy groups. Suitable hydrocarbyl functional groups include, but are not limited to the following: n-pentyl, n-decyl, dodecyl, dodecenyl, dodecylallyl, n-octadecyl, benzyl, allylbenzyl, dodecyl benzyl, anisyl, and phenoxyethyl. Preferably, X is a halide such as chloride or bromide.

In its preferred embodiment, the strongly basic quaternary ammonium anion exchange resins of this invention, I, which possess unusual and unexpected sugar decolorizing properties, are prepared by reacting the compound RX, II, wherein R is an alkyl or aralkyl hydrocarbyl functional group and X is a chloride or bromide anion, respectively, as defined above, with the insoluble, crosslinked, macroreticular or gel-type, weakly basic tertiary amine acrylamide precursor resin substrate having a plurality of units of structural formula III, wherein Y is the dimethylamino ($—N(CH_3)_2$) group, as shown in the equation above.

The precursor resins used in this invention are crosslinked tertiary amine macroreticular and gel-type resins which are (a) in the former case, the product of the reaction of a polyamine with a crosslinked macroreticular copolymer of 0.1% – 50% by weight of a polyethylenically unsaturated monomer and 50% – 99.9% by weight of monoethylenically unsaturated aliphatic ester of acrylic acid and, (b) in the latter case, the product of the reaction of a polyamine with a crosslinked gel-type copolymer of 0.1% - 50% by weight of a polyethylenically unsaturated monomer and 50% - 99.9% by weight of a monoethylenically unsaturated ester of acrylic acid. In its most preferred embodiment, the precursor resins of this invention are (a) the crosslinked macroreticular resin product of the reaction of N,N-dimethylaminopropylamine with a crosslinked macroreticular copolymer of about 90% methyl acrylate, about 8% divinylbenzene and about 2% diethylene glycol divinyl ether, and (b) the crosslinked gel-type resin product of the reaction of N,N-dimethylpropylamine with a crosslinked gel-type copolymer of about 95.8% by weight of ethyl acrylate, about 3.7% by weight of divinylbenzene and about 0.5% by weight of diethylene glycol divinyl ether.

The quaternization reaction of the compound R-X, II, with the precursor resin having units of formula III, is performed in a polar organic swelling solvent, for example, in methyl ethyl ketone, or in water, with added alkali metal catalyst, for example, potassium iodide, in "catalytic amount" (0.05 - 0.50 g.) and with agitation. The reaction temperature for the quaternization reaction may range from $-80°$ C. to $150°$ C. Under these conditions, the quaternization reaction system constitutes a heterogeneous system in that the precursor tertiary amine resin does not dissolve but, rather, becomes suspended in the solvent. The reaction may be carried out for a period of between 1 to 60 hours. The preferred conditions employed in the quaternization reaction depend on the reactivity of the selected RX compound with the precursor tertiary amine resin.

When R is an aryl or alkaryl functional group as defined hereinabove, it is suggested that the resins of this invention, I, be prepared by reacting the compound RX, II, wherein R is an aryl or alkaryl functional group and X is the N,N-dimethylamino functional group with a precursor copolymer substrate having a plurality of units of structural formula III wherein Y is a halide functional group such as, for example, chloride. It is further suggested that the precursor copolymers substrate, III, wherein Y is chloride, be prepared by reacting 3-amino-1-propanol, IV, with a copolymer which comprises a preponderant amount of copolymerized esters of acrylic acid in a crosslinked macroreticular or gel-type matrix, V, to give an amidopropanol intermediate which is further reacted a suitable halogenating agent, such as, for example, thionyl chloride or phosphorus trichloride, as shown by the following equation:

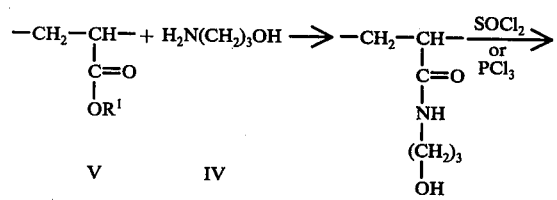

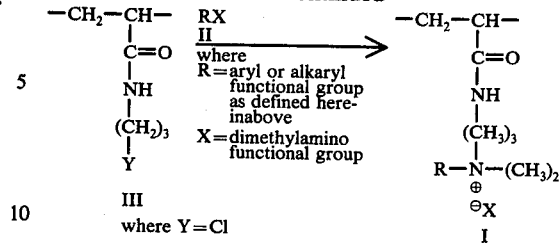

It is demonstrated in this invention that the combination of the ion exchange properties and the hydrophobic bonding properties provides the unusual and unexpected sugar decolorizing capabilities of the resins of this invention when contacted with aqueous sugar solutions. Application of this principle may be extended for properly selected resins to other uses such as dye removal from waste streams, color and COD (chemical oxygen demand) removal from pulp mill waters. Also, an oleophilic hydrocarbyl functional group such as R, as defined hereinabove, when bonded to the quaternary nitrogen atom of a quaternary ammonium ion exchange resin, may serve to aid the quaternary ammonium group in resisting oxidative attack such as occurs in plating bath treatments with ion exchange resins.

The standard properties of the resins of this invention and of the known macroreticular quaternary ammonium acrylamide resin wherein R is methyl are given in Table I.

TABLE I

Standard Properties of Quaternary Ammonium Chloride Acrylamide Resins,[1] I.

| Quaternary Ammonium Resins[1] $R=$ | % Solids | AEC (meγg) | TBS(meγg) |
|---|---|---|---|
| Pentyl | 35.3 | 3.62 | 3.06 |
| Decyl | 55.5 | 2.94 | 2.38 |
| Benzyl | 39.4 | 3.28 | 2.84 |
| Benzyl (Gel resin) | 51.6 | 3.84 | 2.80 |
| Octadecyl (Methyl 21:74) | 39.9 | 3.52 | 3.33 |
| Anisyl | 46.5 | 3.08 | 2.34 |
| Dodecylbenzyl | 66.2 | 2.17 | 1.77 |
| Methyl | 27.6 | 4.13 | 3.78 |

[1]Macroreticular acrylamide resins except where otherwise indicated.

The sugar decolorizing properties of the resins of this invention are demonstrated by three experiments. The first experiment involves the decolorization of an influent refinery sugar syrup containing 0.56 $a*_7$ color at pH 7.4 (where $a*_7$ = the absorption of light of a 60% sugar solution at pH 7 and room temperature versus that of water at 420 mu in a 1 cm. cell). Multiple cycles are performed using automatic instrumentation with brine (10% NaCl) regeneration at the 15 lb/ft³ level.

TABLE II

Sugar Decolorization Properties of Crosslinked Macroreticular Quaternary Ammonium Acrylamide Resins

| Cycle No. | Effluent Color ($a*_7$) | | | |
|---|---|---|---|---|
| | R=Methyl | R=Pentyl | R=Octadecyl | R=Benzyl |
| 1 | 0.135 | | 0.089 | 0.081 |
| 2 | | | | |
| 3 | 0.162 | 0.135 | 0.119 | 0.081 |
| 4 | | | | |
| 5 | 0.163 | | 0.123 | |
| 6 | | | | |
| 7 | | | | 0.094 |
| 8 | 0.163 | | | |
| 9 | | | 0.120 | |
| 10 | | | | |

TABLE II-continued

Sugar Decolorization Properties of
Crosslinked Macroreticular Quaternary
Ammonium Acrylamide Resins

| Cycle No. | Effluent Color ($a^*_7$) | | | |
|---|---|---|---|---|
| | R=Methyl | R=Pentyl | R=Octadecyl | R=Benzyl |
| 11 | 0.146 | 0.140 | | 0.106 |
| 12 | | | | |
| 13 | | 0.141 | 0.130 | 0.105 |
| 14 | | | | |
| | Influent Color | → 0.56 $a^*_7$ | | |
| | Flow Rate | → 3 BV/Hr. | | |
| | Cycle Length | → 24 BV | | |
| | Regeneration | → 150 lb/ft$^3$ | | |
| | Bed Volume | → 40 mls. | | |

The results of this experiment, shown in Table II, demonstrate that the quaternary ammonium acrylamide resins of this invention (wherein R is benzyl, pentyl, octadecyl, benzyl, respectively) offer increased adsorption of sugar color bodies as compared with the known macroreticular quaternary ammonium acrylamide resin wherein R is methyl.

The data demonstrate that the resins of this invention achieve a greater level of adsorption of sugar color bodies in fewer cycles than does the known resin described hereinabove. Furthermore, the resins of this invention maintain a higher level of adsorption of sugar color bodies throughout a greater number of cycles than does the known resin before the resins are exhausted.

Clearly, the resin of this invention wherein R is benzyl offers the greatest sugar decolorizing properties of the resins tested.

The second experiment, which represents a polishing of the residual refractory color, is conducted upon influent sugar syrup which is identical to that used in the first experiment described hereinabove. This syrup is pre-treated with the known conventional macroreticular quaternary ammonium acrylamide resin wherein R is methyl and this effluent is treated further with (a) a known gel-type styrene-divinyl benzene quaternary N-trimethylammonium resin and (b) macroreticular resin of this invention wherein R is benzyl. Regeneration consists of 15 lb. NaCl plus 0.2% NaOH per cubic foot of resin and countercurrent. The results of this experiment are shown in Table III in which the macroreticular quaternary ammonium acrylamide resin of this invention wherein R is benzyl is observed to compare closely with the best known conventional polishing resin, a low crosslinked gel-type styrene-divinylbenzene quaternary N-trimethylammonium resin in the removal of refractory color. However, the macroreticular resin of this invention, wherein R is benzyl, is observed to offer significant improvements over the conventional polishing resin in terms of its regeneration efficiency (of the absorbed color by the brine) and its physical stability, both of which properties ensure longer resin life.

TABLE III

POLISHING OF SUGAR SYRUP
Influent color = 0.108 $a^*_7$
Flow Rate = 3 BV/Hr.
Downflow

| | | Effluent Color $A^*_7$ | |
|---|---|---|---|
| Cycle No. | Thruput (BV) | Gel Resin, I, R=Methyl | MR Resin, I, R=Benzyl |
| 1 | 33 | 0.037 | 0.050 |
| 2 | 25 | 0.037 | 0.047 (38.7$^+$) |

TABLE III-continued

POLISHING OF SUGAR SYRUP
Influent color = 0.108 $a^*_7$
Flow Rate = 3 BV/Hr.
Downflow

| | | Effluent Color $A^*_7$ | |
|---|---|---|---|
| Cycle No. | Thruput (BV) | Gel Resin, I, R=Methyl | MR Resin, I, R=Benzyl |
| 3 | 40 | 0.065 (38.0$^+$) | 0.065 (44.0$^+$) |

$^+$ = % Regeneration of loaded color
$a^*_7$ = The absorption of light of a 60% sugar solution at pH 7 and room temperature versus that of water at 420 mu in a 1 cm. cell The third experiment demonstrates the use of the resins of this invention in series combinations as defined hereinabove, with conventional resins, the results of which are presented in Table IV. Each series combination of resins treats influent sugar syrup which is identical to that used in the two experiments described hereinabove. The first series combination, Series No. 1, represents the best known series combination of conventional resins which comprises the known macroreticular quaternary ammonium acrylamide resins wherein R is methyl in the primary position of the series followed by the known low crosslinked, gel-type styrene-divinylbenzene quaternary N-trimethylammonium resin described hereinabove in the polishing position. This series combination is used herein as the basis for comparison with the following series combinations which include the resins of this invention. The second series combination, Series No. 2, comprises a 1:1 mixture of two of the resins of this invention, the macroreticular resins wherein R is benzyl and octadecyl, respectively, in the primary position followed by the low crosslinked gel-type styrene-divinylbenzene quaternary N-trimethylammonium resin in the polishing position as used in Series No. 1. The third series combination, Series No. 3, comprises a three-bed resin system with the known macroreticular quaternary ammonium acrylamide resin wherein R is methyl in the primary position, the low-crosslinked, gel-type styrene-divinylbenzene quaternary N-trimethylammonium resin described hereinabove in the secondary position and the resin of this invention wherein R is anisyl in the polishing position. The results of this experiment clearly demonstrate that the use of the resins of this invention in series combinations offer significant improvement over the standard series combination of conventional resins in terms of diminishing residual color in the product sugar. The comparison of the two two-bed resin systems, Series Nos. 1 and 2, with the three-bed resin system, Series No. 3, is considered to be valid in that the treatment rate of sugar syrup per unit volume of total resin in each series combination in this experiment is identical.

TABLE IV

Comparison of Series Combination
Quaternary Ammonium Resin Systems

| Series Combination | Effluent Sugar Quality Ave. Effluent Color ($a^*_7$) |
|---|---|
| No. 1 Known Macroreticular Acrylamide Resin (R=methyl) ↓ Gel-type Styrene-divinylbenzene Quaternary N-trimethylammonium | |

TABLE IV-continued
Comparison of Series Combination Quaternary Ammonium Resin Systems

| Series Combination | | Effluent Sugar Quality Ave. Effluent Color (a*₇) |
|---|---|---|
| No. 2 | Resin 1:1 Mixture of Macroreticular Acrylamide Resins (R=benzyl and octadecyl, respectively) ↓ Gel-type Styrene-divinylbenzene Quaternary N-trimethylammonium Resin | 0.083 |
| No. 3 | Known Macroreticular Acrylamide Resin (R=methyl) ↓ Gel-type Styrene-divinylbenzene Quaternary N-trimethylammonium Resin ↓ Macroreticular Acrylamide Resin (R=anisyl) | 0.076<br><br><br><br>0.068 |

The specification, claims and the following examples in which all parts are by weight unless otherwise indicated, serve to further illustrate the process of the invention and the products thereof.

EXAMPLE 1

A 50 g. portion of n-bromopentane (99%) is added to a mixture of 50 g of dry crosslinked macroreticular, weakly basic resin product of the reaction of N,N-dimethylpropylamine with a crosslinked macroreticular copolymer of about 90% methyl acrylate, about 8% divinylbenzene, and about 2% diethylene glycol divinyl ether, 300 ml. of methyl ethyl ketone and 0.35 g of potassium iodide. This reaction mixture is then warmed to 80° C and refluxed at that temperature for 9 hours. The reaction mixture is then cooled to ambient temperature, the solvent removed by suction and the resin washed several times with methanol and then with water. The washed beads are drained and packed out wet to give a sample containing 40% solids and with a strong base capacity of 84.5%.

EXAMPLE 2

A 71 g portion of n-bromodecane (98%) is added to 50 g of the dry weakly basic acrylamide resin described in Example 1, 300 ml of methyl ethyl ketone and 0.35 g of potassium iodide. This mixture is then warmed to 80° C and refluxed at that temperature for 9 hours. The reaction is worked-up as described in Example 1 above to yield a wet resin containing 59% solids and with a strong base capacity of 80.7%.

EXAMPLE 3

A 42 g portion of benzyl chloride is added to 50 g of the dry weakly basic acrylamide resin described in Example 1, 170 ml of methyl ethyl ketone and 0.35 g of potassium iodide. This mixture is warmed to 80° C and refluxed at that temperature for 25 hours. The solvent is then removed by an aqueous azetropic distillation with water being continuously added to maintain a constant pot volume. The reaction mixture is next cooled to ambient temperature, the aqueous phase removed by suction, and the resin washed several times with water. The beads are then drained and packed out wet to give a resin containing 39.5% solids and with a strong base capacity of 86.6%.

EXAMPLE 4

A 21 g. portion of benzyl chloride is added to 85 g of wet weakly basic acrylamide resin described in Example 1, 150 ml of water and 0.20 g. of potassium iodide. This mixture is warmed to 100° C and refluxed at that temperature for 24 hours. The reaction mixture is next cooled to ambient temperature, the aqueous phase removed by suction and the resin washed several times with water. The beads are then drained and packed out wet to give a resin containing 34.7% solids and with a strong base capacity of 69.6%.

EXAMPLE 5

A 42 g. portion of benzyl chloride is added to a mixture of 50 g. of dry crosslinked gel-type, weakly basic resin product of the reaction of N,N-dimethylpropylamine with a crosslinked gel-type copolymer of about 95.8% by weight of methyl acrylate, about 3.7% by weight of divinylbenzene, and about 0.5% diethylene glycol divinyl ether, 130 ml. of ethylene dichloride, 0.35 g. of potassium iodide and 0.15 g. of dicylohexyl-18-crown-6 to aid dissoultion of potassium iodide. The mixture is warmed to 80° C and refluxed at that temperature for 24 hours. The reaction is worked up as described in Example 1 above to yield a wet resin containing 51.6% solids and with a strong base capacity of 72.9%.

EXAMPLE 6

A 92.6 portion of n-chloro-octadecane is added to 50 g. of the dry weakly basic acrylamide resin described in Example 1, 130 ml methyl ethyl ketone and 0.35 g. potassium iodide. The reaction mixture is then warmed to 85° C and refluxed at that temperature for 24 hours. The reaction is worked up as described in Example 1 above to yield a wet resin containing 43.2% solids and with a strong base capacity of 20.5%.

A 212 g. portion of the wet product, 100 g. of water and 4.1 g. of sodium carbonate are charged to a Parr bomb and sealed. Methyl chloride is added to the mixture over a 18-hour period at a constant pressure of 45 psi g. The methylchloride cylinder is then disconnected and the pressure reactor is vented slowly. A nitrogen sparge is used for 2 hours to remove excess methylchloride. The beads are then washed with water, drained and packed out. The product contains 39.9% solids and has a strong base capacity of 94.6%.

EXAMPLE 7

A 64 g. portion of anisylchloride is added to 50 g. of the dry weakly basic acrylamide resin described in Example 1, 200 ml. dried acetone and 1 g. potassium iodide. The mixture is then warmed to 58° C. and refluxed at that temperature for 60 hours. The reaction is worked up as described in Example 1 above to give a wet resin containing 46.5% solids and with a strong base capacity of 76%.

EXAMPLE 8

A 50 g. portion of dodecylbenzyl chloride is added to 39 g. of the dry weakly basic acrylamide resin described in Example 1, 100 ml methyl ethyl ketone and 0.35 g. potassium iodide. The mixture is then warmed to 84° C. and refluxed at that temperature 60 hours. The reaction is worked up as described in Example 1 above to give a wet resin containing 66.2% solids and with a strong base capacity of 81.5%.

What is claimed is:

1. A process for decolorizing aqueous sugar solutions which comprises contacting the solution with a crosslinked, macroreticular, quaternary ammonium acrylamide resin which comprises the product of a compound of the formula RX with a crosslinked, macroreticular tertiary amine, acrylamide precursor resin which comprises a copolymer of 0.1%–50% by weight of a polyethylenically unsaturated monomer and 50%–99.9% by weight of a monoethylenically unsaturated aliphatic ester of acrylic acid which has been aminolyzed with a polyamine, said resin comprising units having the chemical formula:

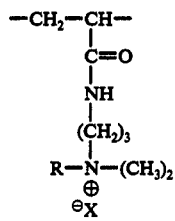

wherein R is a substituted or unsubstituted hydrocarbyl functional group containing 5–22 carbon atoms and X is an anion, either alone or in series combination.

2. The process of claim 1 wherein the crosslinked, macroreticular, tertiary amine precursor resin comprises a copolymer of about 8% by weight of divinyl benzene, about 2% by weight of diethylene glycol divinyl ether, and about 90% by weight of methyl acrylate which has been aminolyzed with N,N-dimethylaminopropylamine.

3. The process of claim 1 wherein R is selected from the group which comprises substituted or unsubstituted (a) alkyl, (b) aralkyl, (c) aryl, and (d) alkaryl functional groups which contain 5 – 22 carbon atoms, is linear or branched, is saturated or unsaturated or a combination of the two, and, if substituted, contains 1 – 3 alkoxy, acyl, acyloxy or hydroxy groups and wherein X is an anion selected from the group which comprises hydroxide, halide, alkyl sulfate, bisulfate, and alkyl and aryl sulfonate anions.

4. The process of claim 1 wherein R is a substituted or unsubstituted (a) alkyl, or (b) aralkyl functional group which contains 5 – 18 carbon atoms, is linear or branched, is saturated or unsaturated or a combination of the two, and, if substituted, contains 1 – 3 alkoxy, acyl, acyloxy, or hydroxy groups, and wherein X is preferably halide such as chloride or bromide.

5. A process for decolorizing aqueous sugar solutions which comprises contacting the solution with a crosslinked, gel-type, quaternary ammonium acrylamide resin which comprises the product of a compound of the formula RX with a crosslinking, gel-type, tertiary amine, acrylamide precursor resin which comprises a copolymer of 0.1%–50% by weight of a polyethylenically unsaturated monomer and 50%–99.9% by weight of a monoethylenically unsaturated aliphatic ester of acrylic acid which has been aminolyzed with a polyamine, said resin comprising units having the chemical formula:

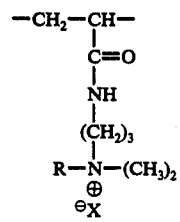

wherein R is a substituted or unsubstituted hydrocarbyl functional group containing 5–22 carbon atoms and X is an anion, either alone or in series combination.

6. The process of claim 5 wherein the crosslinked, gel-type, tertiary amine precursor resin comprises a copolymer of about 3.7% by weight of divinyl benzene, about 0.5% by weight of diethylene glycol divinyl ether, and about 95.8% by weight of ether acrylate which has been aminolyzed with N,N-dimethylaminorpopylamine.

7. The process of claim 5 wherein R is selected from the group which comprises substituted or unsubstituted (a) alkyl, (b) aralkyl, (c) aryl, and (d) alkaryl functional groups which contains 5 – 22 carbon atoms, is linear or branched, is saturated or unsaturated or a combination of the two, and, if substituted, contains 1 – 3 alkoxy, acyl, acyloxy, or hydroxy groups, and wherein X is an anion selected from the group which comprises hydroxide, halide, alkyl sulfate, bisulfate, and alkyl and aryl sulfonate anions.

8. The process of claim 5 wherein R preferably is a substituted or unsubstituted (a) alkyl or (b) aralkyl functional group which contains 5 – 18 carbon atoms, is linear or branched, is saturated or unsaturated or a combination of the two, and, if substituted, contains 1 – 3 alkoxy, acyl, acyloxy, or hydroxy groups, and wherein $X^{\ominus}$ is preferably halide such as chloride or bromide.

* * * * *